United States Patent
Ramachandran et al.

(10) Patent No.: US 9,858,727 B2
(45) Date of Patent: Jan. 2, 2018

(54) AUGMENTED REALITY TOOLS FOR PV SOLAR AND/OR STORAGE SYSTEM SITE SURVEY, INSTALLATION, COMMISSIONING, AND OPERATION AND MAINTENANCE SUPPORTED BY ON-SITE DATA COLLECTION

(71) Applicant: Locus Energy, Inc., Hoboken, NJ (US)

(72) Inventors: Anil Ramachandran, Santa Clara, CA (US); Michael Herzig, Leonia, NJ (US); Shawn Kerrigan, Redwood City, CA (US)

(73) Assignee: Locus Energy, Inc.

(*) Notice: Subject to any disclaimer, the term of this patent is extended or adjusted under 35 U.S.C. 154(b) by 0 days.

(21) Appl. No.: 15/287,001

(22) Filed: Oct. 6, 2016

(65) Prior Publication Data
US 2017/0213390 A1 Jul. 27, 2017

Related U.S. Application Data

(60) Provisional application No. 62/281,795, filed on Jan. 22, 2016.

(51) Int. Cl.
*G09G 5/00* (2006.01)
*G06T 19/00* (2011.01)
(Continued)

(52) U.S. Cl.
CPC ........ *G06T 19/006* (2013.01); *G06K 9/00671* (2013.01); *G02B 27/017* (2013.01); *G02B 2027/0178* (2013.01); *G06T 11/60* (2013.01)

(58) Field of Classification Search
CPC ..... G06T 19/006; G06T 11/60; G02B 27/017; G02B 2027/0178
(Continued)

(56) References Cited

U.S. PATENT DOCUMENTS

2013/0127980 A1* 5/2013 Haddick ................ G06F 3/013
348/14.08

OTHER PUBLICATIONS

Benbelkacem et al., Augmented Reality Platform for Solar Systems Maintenance Assistance, Nov. 2, 2010, p. 1-4.*

* cited by examiner

*Primary Examiner* — Robert Craddock
(74) *Attorney, Agent, or Firm* — Jennifer Meredith, Esq.; Meredith & Keyhani, PLLC

(57) ABSTRACT

A system and method in which information relevant to a Photovoltaic (PV) solar-site specific activity environment is displayed on the display screen of an Augmented Reality (AR) device as part of the surrounding environment, instead of on a separate computing device or an installation manual. The activity environment includes PV solar site-specific survey and feasibility analysis, installation and commissioning, Operation and Maintenance (O&M), and site overhaul/removal activities. Thus, relevant information is available to an installer/technician at their fingertips so that the installer/technician can continue the task they are involved in without losing focus. The AR device may record relevant data during site survey and note important points, accelerate installation and commissioning, make O&M more efficient, and record the complete process for ongoing improvement/management of the site. Moreover, company-specific best practices may be loaded on the AR device as guidelines to make the process uniform across the entire fleet of installers.

17 Claims, 7 Drawing Sheets

(51) Int. Cl.
  *G06K 9/00* (2006.01)
  *G02B 27/01* (2006.01)
  *G06T 11/60* (2006.01)
(58) Field of Classification Search
  USPC .......................................................... 345/633
  See application file for complete search history.

AUGMENTED REALITY TOOLS FOR PV SOLAR AND/OR STORAGE SYSTEM SITE SURVEY, INSTALLATION, COMMISSIONING, AND OPERATION AND MAINTENANCE SUPPORTED BY ON-SITE DATA COLLECTION

TECHNICAL FIELD

The present disclosure generally relates to Photovoltaic (PV) solar sites. More particularly, and not by way of limitation, particular embodiments of the present disclosure are directed to an Augmented Reality (AR) based apparatus and method for managing various site-specific activities for a PV solar site such as, for example, site survey, installation, commissioning, and Operation and Maintenance (O&M).

BACKGROUND

A photovoltaic (PV) system converts the sun's radiation into usable electricity. PV systems range from small, rooftop-mounted or building-integrated systems with capacities from a few to several tens of kilowatts, to large, utility-scale power stations of hundreds of megawatts. Some PV systems may be connected to an electrical grid to enable transmission and distribution of their generated-electricity to other participants in the utility market. On the other hand, some PV systems, such as, for example, residential or small-scale PV systems, may be off-grid or stand-alone systems.

FIG. 1 is a simplified block diagram of an exemplary PV solar system 10. As shown, a typical PV system or PV solar site, such as, for example, the PV system 10, may comprise a solar/PV array 12 and a number of Balance of System (BOS) components, three of which—a charge controller 14, a storage (battery) unit 15, and an inverter 16—are shown in FIG. 1 by way of an example. The BOS components 14-16 may balance the power-generating sub-system of the solar array 12 with the power-using side (the electrical load). For ease of illustration, the electrical load portion is shown using blocks 18 and 20 in FIG. 1, but, in certain implementations, the electrical load 18, 20 may not be considered as part of a PV solar site.

The charge controller 14 may regulate the electrical input received from the PV array 12 so as to satisfy the demand for the Direct Current (DC) load 18 and transfer any additional electricity for storage into the battery unit 15. On the other hand, when the generated electricity (by the PV array 12) is not sufficient to satisfy the requirements of the DC load 18, the charge controller may access the stored electricity from the battery unit 15 and supply it to the DC load 18. The battery or storage unit 15 may also supply electrical energy to an inverter 16, which may convert the stored electric current from DC to AC (Alternating Current) to drive the AC load 20. The DC load 18 may represent systems or devices that operate on DC current, whereas the AC load 20 may represent systems or devices that operate on AC current. Although not shown in FIG. 1, the PV site 10 also may include additional BOS components such as, for example, power-conditioning equipments, structures and racking systems for mounting various BOS components and solar arrays, electrical wiring, cabling, and interconnections, and other electrical accessories to set up a working PV site. In some implementations, the PV site 10 may also use a solar tracking system (not shown) to improve the system's overall performance.

SUMMARY

A PV solar site may have a site-specific activity environment associated with it. For example, before an operational PV solar site is established, it may be required to perform a site survey and feasibility analysis activity. Once an appropriate site is selected, the activity of installation of PV solar system components/units—such as those shown in FIG. 1—and commissioning of those units may be performed. Furthermore, routine operation and maintenance of these units at the PV solar site may need to be carried out, for example, by the personnel from the entity or business running the PV solar site or having installed various units at the site. Additionally, the site may need periodic overhaul and re-evaluation, for example, to determine whether to remove older or less energy-efficient components with modern, more energy-efficient units, and the like.

All of the activities mentioned in the preceding paragraph may be performed by various personnel or technicians during the life cycle of a PV solar site. Currently, when on the site, these technicians use computer or smartphone driven programs and user manuals or best-practice binders, combined with their training, to carry out the required activity. However, a major problem with such a setup is that the information required by a technician or service person is not readily visible in the same context as the task at hand. Furthermore, during a task, switching to refer to documentation can cause a loss of focus, which could be inefficient at beast and dangerous at worst. Thus, the current practice has certain limitations, which do not yield to rapid improvement.

It is therefore desirable to display the information relevant to a PV solar site-specific activity as part of the surrounding environment, instead of on a separate computing device or an installation manual. It is also desirable to provide relevant information at their fingertips so as to enable the installer/technician to continue the task they are involved in without losing focus.

As a solution, particular embodiments of the present disclosure provide for augmented reality (AR) tools which display information related to PV site-specific activity environment on a display screen of an AR device. The activity environment, as mentioned before, may include PV solar site-specific survey, installation, commissioning, and O&M activities. The AR device-based display of relevant information is part of the surrounding environment and not on a separate computing device or in an installation manual. Such an AR device also may make it easier to record relevant data during site survey and note important points, accelerate installation and commissioning, make O&M more efficient, and record the complete process for ongoing improvement/management of the site. Moreover, each solar financing company or installer could develop best practices, which may be loaded on the AR device as guidelines or "recipes" to make the process uniform across the entire fleet of installers, thereby improving the quality of the final outcome and, hence, resulting in a consistent customer experience.

In one embodiment, the present disclosure is directed to an AR device operable to perform the following: (i) monitor a visible field of view of the AR device at a PV solar site, wherein the field of view includes a visible portion of a site-specific activity environment at the PV solar site; and (ii) and display information related to the site-specific activity environment on a display screen of the AR device. The site-specific activity environment may include one of the following PV site-specific activities: (a) PV site survey and feasibility analysis activity, (b) PV site installation and commissioning activity, (c) PV site Operations and Maintenance (O&M) activity, and (d) PV site overhaul activity.

In another embodiment, the AR device may capture visual content associated with a physical location of the AR device, and then determine at least one of the following based on an analysis of the captured visual content: (i) that the AR device is present at the PV solar site, and (ii) the site-specific activity environment surrounding the AR device. The visual content may be still images and/or video clips.

In particular embodiments, the AR device may store the following in its memory: (i) one or more scenes visible through the field of view of the AR device, and (ii) an indication identifying the PV solar site-specific activity related information being displayed on the display screen of the AR device.

In certain embodiments, the information related to the site-specific activity environment may include at least one of the following: (i) first activity-specific data received from an external source for an activity in the site-specific activity environment, (ii) second activity-specific data observed through the visible field of view of the AR device by a user of the AR device for the activity in the site-specific activity environment, and (iii) third activity-specific data recorded by the AR device for the activity in the site-specific activity environment.

In some embodiments, the AR device may display at least a portion of the information related to the site-specific activity environment overlaid on top of a field of view-based scene of the PV solar site. In other embodiments, the AR device may display at least a portion of the information related to the site-specific activity environment on the display screen without displaying other content on the display screen. Furthermore, in one embodiment, the AR device may receive an input from a user of the AR device, and, in response, the AR device may display a user input-specific portion of the information related to the site-specific activity environment on the display screen of the AR device.

In another embodiment, the present disclosure is directed to a data storage medium operable with an AR device and containing program instructions, which, when executed by the AR device, cause the AR device to perform the following: (i) capture visual content within a field of view of the AR device when the AR device is present at a PV solar site, wherein the field of view relates to a visible portion of a site-specific activity environment at the PV solar site; and (ii) display information related to the site-specific activity environment on a display screen of the AR device. As above, the site-specific activity environment may includes one of the following PV site-specific activities: (a) PV site survey and feasibility analysis activity, (b) PV site installation and commissioning activity, (c) PV site Operations and Maintenance (O&M) activity, and (d) PV site overhaul activity.

In various embodiments, the program instructions, when executed by the AR device, may cause the AR device to perform various tasks and operations mentioned above, but not repeated here for the sake of brevity.

In a further embodiment, the present disclosure is directed to a method of facilitating management of a PV solar site using an AR device. The method comprises performing the following by the AR device: (i) monitoring a visible field of view of the AR device; (ii) capturing visual content within the field of view of the AR device; (iii) identifying a site-specific activity environment at the PV solar site based on the captured visual content; and (iv) displaying information related to the site-specific activity environment on a display screen of the AR device. As before, the site-specific activity environment includes one of the following PV site-specific activities: (a) PV site survey and feasibility analysis activity, (b) PV site installation and commissioning activity, (c) PV site Operations and Maintenance (O&M) activity, and (d) PV site overhaul activity.

In a further embodiment, the method also comprises: (i) processing and analyzing a first portion of the captured visual content to determine first activity-specific visual information for an activity in the site-specific activity environment; (ii) sending a second portion of the captured visual content to an external source for processing and analysis; (iii) receiving second activity-specific visual information from the external source for the activity in the site-specific activity environment; and (iv) displaying the first and the second activity-specific visual information on the display screen of the AR device.

Thus, the AR device-based display of PV solar site-specific activity environment allows the installer/technician to continue on the task they are involved in, without losing focus. Such a display provides the relevant information at the fingertips of the installer, technician, or other service/maintenance person. The information may be customized as well, and may also be made available in real-time. Furthermore, different PV solar equipments may be added to the content library and customized instructions specific to each equipment type also may be added. This content may be displayed on the technician's AR device, ensuring that the technician quickly gets the accurate information for a specific equipment type or model on hand.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "real-time," "site-specific", "on-site," etc.) may be occasionally interchangeably used with its non-hyphenated version (e.g., "real time," "site specific", "on site," etc.), and a capitalized entry (e.g., "Augmented Reality," "Battery Unit," etc.) may be interchangeably used with its non-capitalized version (e.g., "augmented reality," "battery unit," etc.). Such occasional interchangeable uses shall not be considered inconsistent with each other.

It is noted at the outset that the terms "coupled," "operatively coupled," "connected", "connecting," "electrically connected," etc., are used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale.

The terms "first," "second," etc., as used herein, are used as labels for nouns that they precede, and do not imply any type of ordering (e.g., spatial, temporal, logical, etc.) unless explicitly defined as such.

Figure 1:
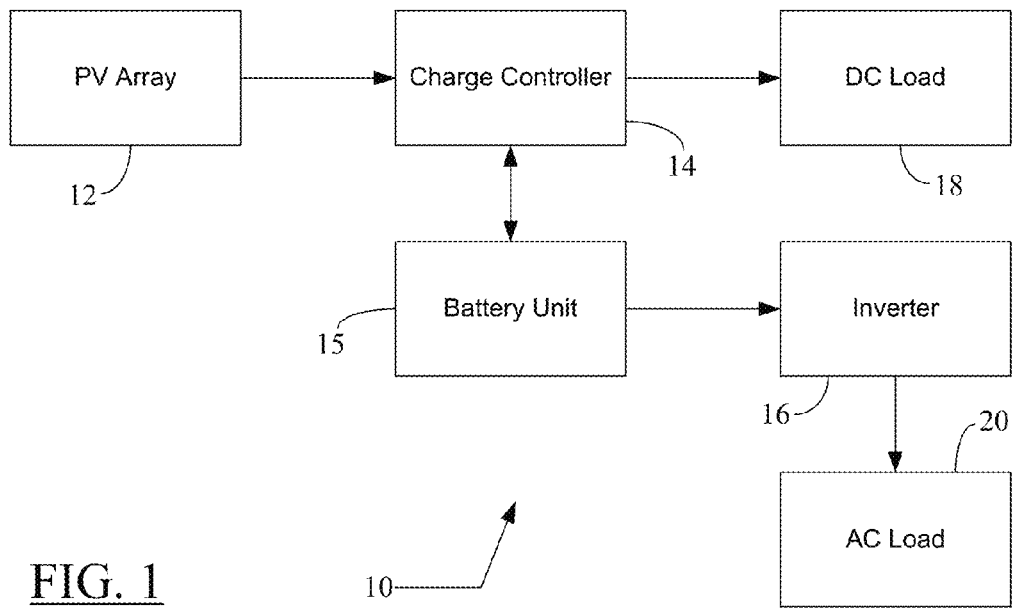
FIG. 1 is a simplified block diagram of an exemplary PV solar system.
Figure 2:
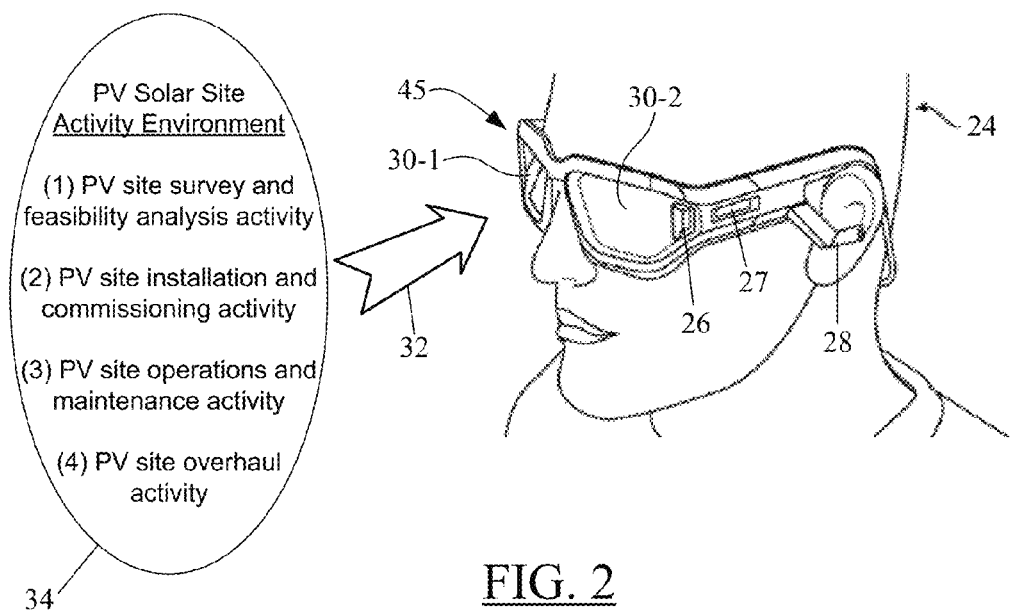
FIG. 2 provides an exemplary illustration of what type of information may be displayed on an AR device as per teachings of one embodiment of the present disclosure.

FIG. 2 provides an exemplary illustration of what type of information may be displayed on an AR device 22 as per teachings of one embodiment of the present disclosure. As shown, the AR device 22 may be a wearable in the field by a human installer/technician 24 or may be a head-set free AR device. The wearable AR device 22 may be in the form or shape of a pair of eyeglasses or goggles. Some exemplary AR-based devices include, for example, the Microsoft® HoloLens, the Google® Glass, or some other such wearable unit providing AR platform. On the other hand, a smartphone may be configured to operate in a head-set free or non-wearable mode of AR. For example, a PV solar site installer may configure a smartphone with an app that uses the camera of the smartphone and combines visual information from the camera and from a secondary source (such as, for example, an internal program, database, or an external source) to provide relevant information in an AR-like manner to a customer, such as, for example, a homeowner. For the sake of brevity, the discussion below primarily focuses on a headset-type or wearable AR device. However, it is understood that the discussion remains equally applicable to devices providing AR functionality in a head-set free or non-wearable manner. It is noted here that the term "AR device" or "AR unit" (or other such terms of similar import), as used herein, generally refers to a device, unit, or system that supports at least an AR-based application platform. The AR device may support or work with additional platforms as well, such as, for example, a Virtual Reality (VR) platform or a Mixed Reality (MR) platform. Two additional exemplary AR devices are shown in FIGS. 3-4, which are described later below.

The exemplary AR device 22 in FIG. 2 is shown to include three built-in units on one side thereof: a camera or imaging sensor 26, a microphone 27, and a headphone or speaker 28. In some embodiments, the other side of the AR device 22 may also include one or more of these units for additional visual coverage and/or audio fidelity. The AR device 22 may include a display screen 30, which is comprised of two portions that are identified by reference numerals "30-1" and "30-2" in FIG. 2. In certain embodiments, there may be a single, continuous display screen, as shown, for example, in the embodiment of FIG. 4. As discussed in more detail below with reference to FIGS. 5-8, information related to PV solar site-specific activity environment may be displayed on one or both portions 30-1, 30-2 of the display screen 30 of the AR device 22, as indicated by arrow 32 in FIG. 2.

A brief outline of each activity that constitutes a PV solar site-specific activity environment is provided using the oval 34 in FIG. 2. In particular embodiments, the PV solar site-specific activity environment may refer to one of four different activities: (i) PV site survey and feasibility analysis activity, (ii) PV site installation and commissioning activity, (iii) PV site operations and maintenance (O&M) activity, and (4) PV site overhaul activity. Depending on the activity currently being performed by a service person or technician, the activity-related information and additional relevant content may be displayed on the AR device's display screen 30 as discussed in more detail later below.

Figure 3:
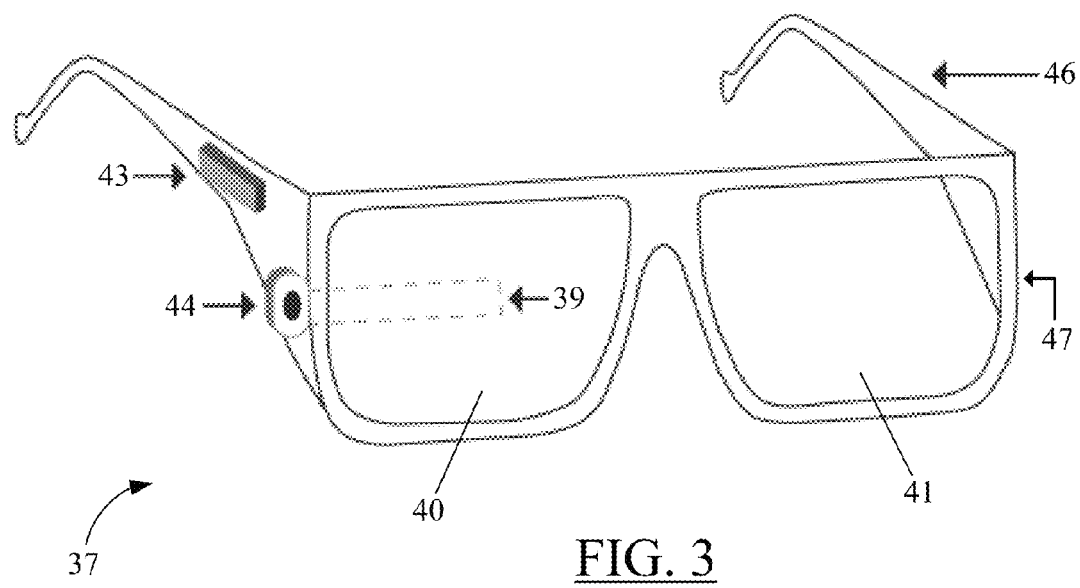
FIG. 3 shows an exemplary AR device that may be used in particular embodiments to implement the teachings of the present disclosure.
Figure 4:
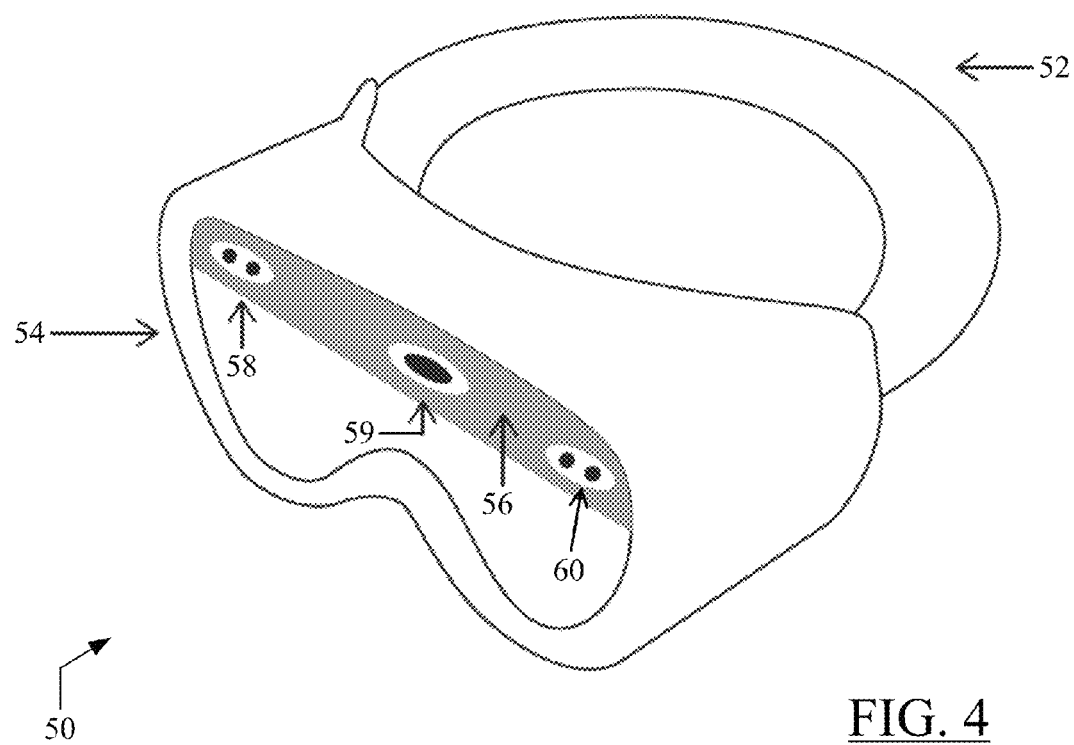
FIG. 4 depicts another exemplary AR device that may be used in certain embodiments to implement the teachings of the present disclosure.

FIG. 3 shows an exemplary AR device 37 that may be used in particular embodiments to implement the teachings of the present disclosure. The AR device 37 may be considered as a specific example of the more general AR device 22 shown in FIG. 2. The device 37 may be an AR glass, such as, for example, the Google® Glass, where there is a display 39 in the viewer's field of vision that the viewer can look at for added information related to a PV solar site's activity environment. The viewer is aware that the display 39 is separate, and it works like having a small television-type display with added information within the viewer's field of view at all times that the viewer can look at if the viewer wishes to. Thus, the display 39 is shown dotted in FIG. 3 to distinguish it from the viewer's regular field of vision available through the corresponding glass portion 40. A similar display (not shown) may be provided on the other glass portion 41. Furthermore, The AR glass 37 may include a touchpad 43 located on the side of its glass frame, allowing users to control the device by swiping through an interface displayed on the screen 40. There also may be a camera 44 mounted on the side of the AR glass 37 with the ability to take photos and record High Definition (HD) videos. Although not visible in FIG. 3, in some embodiments, the AR device 37 may include an additional touchpad 46 and an additional camera 47 on the other side of its glass frame. The AR device 37 may have built-in speakers as well (not shown).

FIG. 4 depicts another exemplary AR device 50 that may be used in certain embodiments to implement the teachings of the present disclosure. The AR device 50 may be considered as a specific example of the more general AR device 22 shown in FIG. 2. The AR device 50 in FIG. 4 may include a headband 52 to make it wearable and may be of the holographic kind, such as, for example, the Microsoft® HoloLens type AR device, where the AR information may appear to be projected contiguously within the viewer's field of vision. In FIG. 4, the field of vision is indicated by the reference numeral "54", which is also used to refer to the non-segmented display screen (or viewing glass) of the AR device 50. The AR information may be just overlaid—as indicated by the continuous grey portion 56 on the display screen 54—on top of the things the viewer is already looking at. Hence, in the AR glass 50 in FIG. 4, there is no feeling of a separate display, like the display 39 in case of the embodiment in FIG. 3. In particular embodiments, the AR information may include information related to the PV solar site-specific activity environment, as noted at block 34 in FIG. 2.

Like the AR unit 37 in FIG. 3, the AR unit 50 in FIG. 4 also may include one or more built-in sensors 58-60. Some examples of these sensors 58-60 include a camera, a microphone, a touch-sensitive input sensor, or any other type of audio-visual sensor. Thus, for example, in one embodiment, all of the sensors 58-60 may be cameras having audio-visual recording capability. In another embodiment, the sensor 58 and 60 may be imaging sensors or cameras without any video capture capability, whereas the central sensor 59 may be an audio-visual recording device, such as a video camera. In yet another embodiment, the end sensors 58 and 60 may be video cameras, whereas the central sensor 59 may provide touchpad functionality. Additional configurations for the sensors 58-60 may be possible in different embodiments. The AR device 50 may have built-in speakers as well (not shown).

It is noted that each of the AR devices 22, 37, and 50 may include communication capability—as discussed later with reference to the embodiment of FIG. 10—to communicate, preferably wirelessly, with various local and remote sources of information to enable the device to obtain and display the most relevant information associated with a PV solar site-specific activity.

Figure 5:
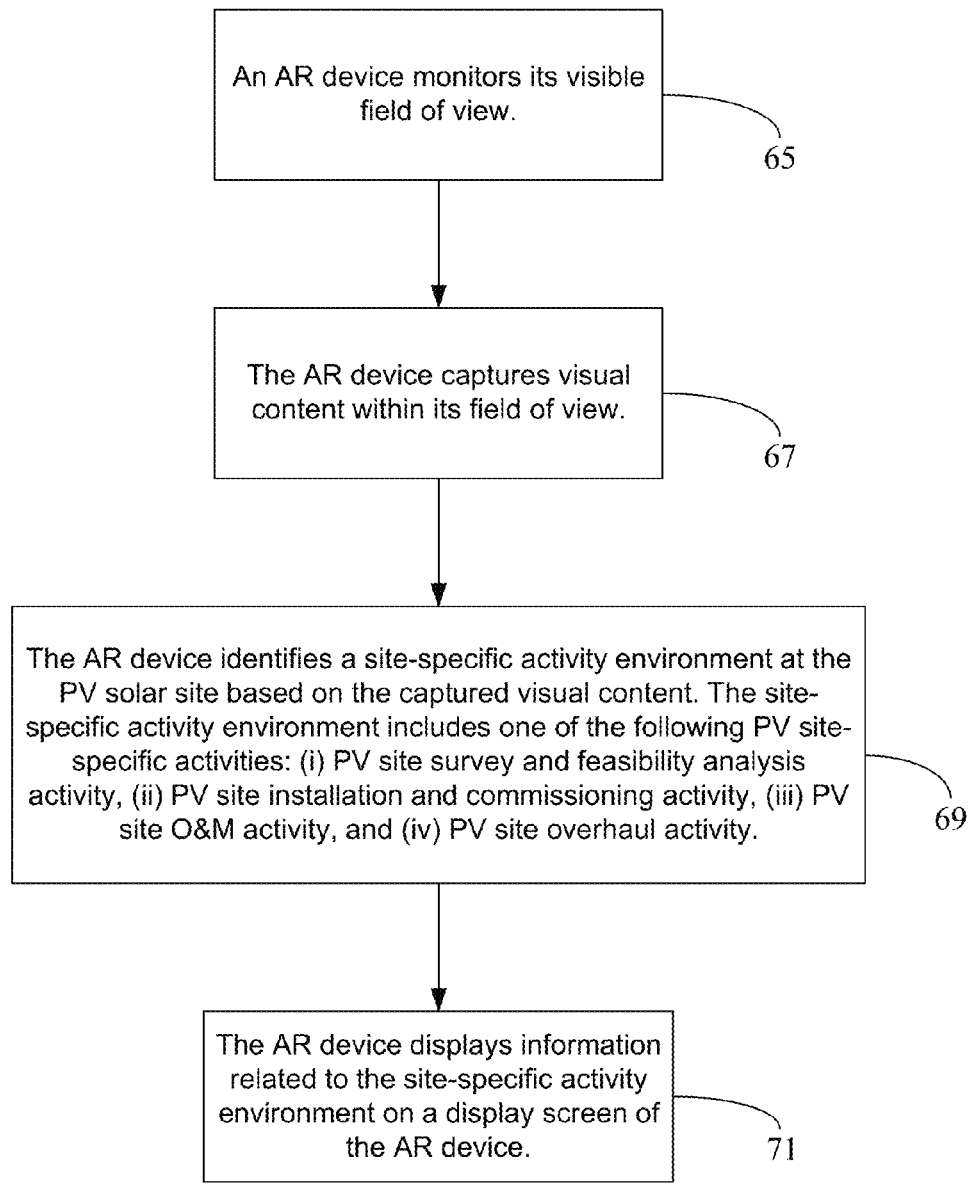
FIG. 5 shows an exemplary flowchart illustrating an AR device-based PV solar site-specific information display methodology according to one embodiment of the present disclosure.

Prior to discussing FIG. 5, a brief overview of the teachings of present disclosure is now provided. In particular embodiments, the methodology as per teachings of the present disclosure could reside as a standalone augmented reality wearable unit, or as software that could run on an augmented reality platform such as, for example, the AR device 22 in FIG. 2. The AR system 22, when configured to implement the teachings of the present disclosure, may display informational elements either overlaid on top of real objects and surfaces in the user's visible field (as shown, for example, in the embodiment of FIG. 7 (discussed later) and also discussed before in the context of FIG. 4), or display relevant information on a display screen that is also visible from the wearable device (as in case of the embodiment of FIG. 3). As mentioned earlier, the AR device 22 may include a camera and communication capability. Furthermore, the AR device 22 may use local or remote computing power/ resources to process and recognize the equipment (at a PV solar site) from the camera images of the user's visible field of view. Following this, relevant information may be displayed on the in-built screen or overlaid on top of the actual relevant surface/object. A user input capability on the device may allow some rudimentary navigation such as navigating a menu, or a checklist for installation, or passing through different stages of a guided install procedure, and the like.

FIG. 5 shows an exemplary flowchart 63 illustrating an AR device-based PV solar site-specific information display methodology according to one embodiment of the present disclosure. For ease of discussion, the description of FIGS. 5-10 will be provided with reference to the generic AR device 22 shown in FIG. 2, and not with reference to the specific examples 37, 50 shown in FIGS. 3-4, respectively. However, it is evident that the discussion of FIGS. 5-10 will equally apply to any of the AR devices 37 and 50.

Figure 6:
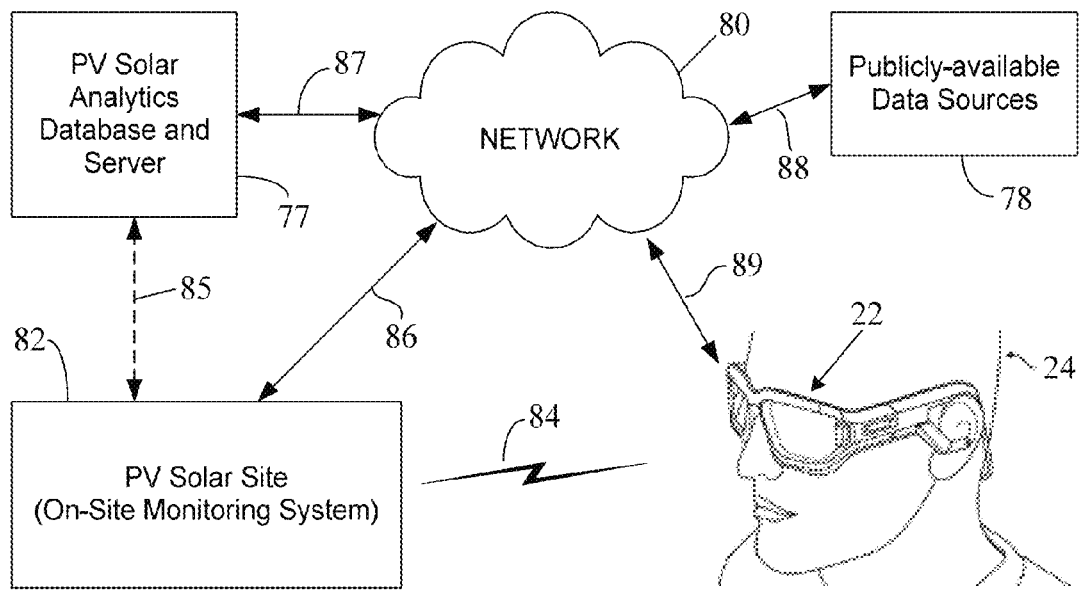
FIG. 6 is an exemplary block diagram of a network-based system according to one embodiment of the present disclosure.

In the method of FIG. 5, at block 65, an AR device, such as the AR device 22, may monitor its visible field of view. In one embodiment, based on the monitoring of the field of view, the AR device 22 may self-determine that it is present at a PV solar site. In another embodiment, the AR device 22 may determine that it is present at a PV solar site based on an indication thereof received from an external source (not shown) such as, for example, a GPS (Global Positioning System) system monitoring the location of the AR device 22 via a satellite link or a PV solar site-based monitoring system operable to detect the presence of the AR device 22 on the site and wirelessly communicating with the AR device. A communication network based embodiment is shown in FIG. 6 (discussed later).

At block 67, the AR device 22 may capture the visual content within its field of view. The visual content may be associated with a current physical location of the AR device 22 and may include still images and/or audio-visual or video clips. As noted before, the AR device 22 may include a camera or an image sensor unit to capture the visual content. In one embodiment, the AR device 22 itself may process and analyze the captured visual content. However, in another embodiment, the AR device 22 may have at least some of the captured visual content processed and analyzed by an external source such as, for example, a remote server, as discussed later with reference to the embodiment in FIG. 6. In one embodiment, based on the analysis of the captured visual content, the AR device 22 may determine that the AR device is present at the PV solar site.

As noted at block 69, the AR device 22 may identify the site-specific activity environment at the PV solar site based on the captured visual content. For example, based on the above-mentioned analysis of the captured visual content, the AR device 22 may determine the site-specific activity environment surrounding the AR device. Such determination may be in addition to or in place of the above-mentioned determination that the AR device is present at the PV solar site. Thus, the analysis of the visual content may indicate that the technician or service person wearing the AR device is present on the PV solar site to perform an installation and commissioning activity, or a site maintenance activity, and the like.

At any given time, the site-specific activity environment may include one of the following PV solar site-specific activities: (i) the PV solar site survey and feasibility analysis activity, (ii) the PV solar site installation and commissioning activity, (iii) the PV solar site O&M activity, and (iv) the PV solar site overhaul activity. These activities have been briefly described earlier before and, hence, such description is not repeated herein for the sake of brevity. However, exemplary activity-specific information elements are described below.

At block 71, the AR device 22 may display information related to the PV solar site-specific activity environment on a display screen, such as the display screen 30 of the AR device 22 in FIG. 2. The following is an exemplary list of information elements that may be displayed to the installer/ electrician/technician during different phases of a PV solar system's life cycle. In some embodiments, the AR device 22 may be configured to record such information about the site as well.

Site Survey and Feasibility Analysis

The following is an exemplary list of information associated with the PV solar site survey and feasibility analysis activity. Any or all of the following information may be displayed on an AR device, such as the AR device 22 in FIG. 2, when a technician/service person performs this activity.
  a. Customer information, including name, picture, specific likes, dislikes, and custom requests. These notes may be collected and stored by other employees in a cloud-based system, and transmitted to the AR system as needed. An exemplary cloud-based server where such information may be stored is shown in FIG. 6 (discussed below).
  b. Location information of the PV solar site.
  c. Expected PV generation profile.
  d. Shading analysis for the PV solar site.
  e. Pre-install energy consumption profile (potentially from green button or other customer authorized utility data access).
  f. Panel and equipment sizing and spacing overlays.
  g. Images and video of the site for reference by site designers or later troubleshooting.

Installation and Commissioning

The following is an exemplary list of information associated with the PV solar site installation and commissioning activity. Any or all of the following information may be displayed on an AR device, such as the AR device 22 in FIG. 2, when a technician/service person performs this activity.
  a. Customer information, including name, picture, specific likes, dislikes, and custom requests. These notes may be collected and stored by other employees in cloud-based system, and transmitted to the AR system as needed. An exemplary cloud-based server where such information may be stored is shown in FIG. 6, which is discussed later below.
  b. Planned panel and equipment location overlay.
  c. Planned cabling overlays.
  d. Installation procedure walkthrough checklist with relevant information for each stage.
  e. Split installation checklist profiles depending on the service person's role (electrician vs. rooftop panel attachment worker).
  f. Communication between instances of the application running on different units to help coordinate tasks with other members of install crew. In particular embodiments, the application may include program code, which, when executed by an AR device, may cause the AR device to display the information as per teachings of the present disclosure.
  g. Current or recent (solar) irradiance information and expected PV charge generation.
  h. Storage state of charge and charging/discharging state of the storage unit.
  i. Terminal wiring guidance overlay, such as, for example, position and wire color of different signals when wiring up a connector cable.
  j. Equipment profiles can be added to recognize and customize guidance to specific equipment (for example, specific brand of inverter, meter, etc.).
  k. Home electrical wiring guidance based on system and home loads and service entry size information as well as specific type of wiring in use.
  l. PV observed DC generation data (each string).
  m. PV AC energy, power, voltage, current, frequency, and phase angle data.
  n. Status codes or fault codes from equipment being installed or commissioned.
  o. A check mark when the observed output matches the expected output from the system, indicating installation success.
  p. An installation guidelines or recipe customized for the specific solar financing/leasing/O&M company.
  q. As-built images and videos for later use. For example, the use could include (but not limited to) the following: independent verification/audit of the installation, recording of the as-built system configuration for designers to create final as-built drawings, reference for troubleshooting at a later date based on changes to the system environment, and the like.
  r. Live video conferencing so off-site experts can provide step-by-step guidance to the on-site technician, or review the work. The AR device may provide an off-site person with video of what the technician is looking at, while projecting a video of the off-site person or their computer's screen on the technician's augmented reality display. This could be used for resolving installation issues, training, or in support of off-site quality assurance activities.

Operations and Maintenance (O&M)

The following is an exemplary list of information associated with the PV solar site O&M activity. In certain embodiments, this list is in addition to the items already mentioned above with reference to the installation and commissioning activity. Any or all of the following information may be displayed on an AR device, such as the AR device 22 in FIG. 2, when a technician/service person performs the O&M activity.
  a. Quick display of any major or critical issues with the system based on error codes or generated alerts (for example, zero generation of PV charge, no communication from an equipment, and so on).
  b. Navigable charts of generation history.
  c. Navigable charts of charge/discharge/state of charge history for storage.
  d. Error and status codes from equipment, along with troubleshooting information such as, for example, resolution processes for faults.
  e. Specific data points by menu selection.
  f. Specific data points and maintenance history data based on what the technician is looking at, such as, for example, showing production data for an inverter that the technician is looking at, along with the service history of the inverter.
  g. Specific images and videos from earlier points in time (for example, site survey, installation and commissioning, or earlier operations and maintenance visits) that relate to what the technician is currently looking at. For example, the system might show a time history of the inverter, panels, or nearby plants and trees, helping the technician identify what has changed since the initial installation. These images and videos could be from all site visits, shared across technicians and other employees.
  h. Technical support contact information and technical support instructions delivered through the augmented reality system, such as, for example, a checklist of standard checks for the field technician to cover, notes from previous technician site visits (across all technicians), or specific case notes for the current site visit.
  i. Hyper-local routing guidance for the equipments that are having problems. A challenge on larger sites is finding the inverter or other equipment that is having a problem, among all the equipments on the site. The technician may have the model number, but finding the specific equipment among all the others on the site can be time-consuming. An AR device, such as the AR device 22, may be configured to display routing directions to guide the technician to the specific equipment that is having the problem.

Major Overhaul or Removal

The following is an exemplary list of information associated with the PV solar site over-haul/removal activity. Any or all of the following information may be displayed on an AR device, such as the AR device 22 in FIG. 2, when a technician/service person performs the this activity.

a. Removal/disposal checklist.

b. New equipment installation guidance, which may be treated the same as original installation, and, hence, various information elements mentioned above with reference to the "installation and commissioning" activity may be displayed in this context as well.

In addition to the display of the activity-specific information, the AR device 22 may also have the ability to record both what is in the installer's view as well as what is being displayed to the installer so that both the process and the information displayed to assist with the process can be reviewed and improved upon.

It is noted here that the AR device 22 (and its specific versions 37 and 50 in FIGS. 3-4, respectively) may be configured (in hardware, via software, or both) to implement some or all of the PV solar site activity-specific content display and recording aspects as per teachings of the present disclosure. For example, when existing hardware of the AR device 22 cannot be modified, the content display and recording methodology according to one embodiment of the present disclosure may be implemented through suitable programming of one or more processors in the AR device 22. Such processor(s) may be, for example, the processor 117 in FIG. 10. Upon execution of the program code by a processor in the AR device 22, the AR device 22 may be operative to perform various display, recording, network communication, and human interaction functions discussed with reference to FIGS. 5-9. Thus, in the discussion herein, although an AR device, such as any of the AR devices 22, 37, or 50, may be referred to as "performing," "accomplishing," or "carrying out" a function or process, it is evident to one skilled in the art that such performance may be technically accomplished in hardware and/or software as desired.

FIG. 6 is an exemplary block diagram of a network-based system 75 according to one embodiment of the present disclosure. In the system 75, the AR device 22 is shown to be in communication with two remote data sources 77-78 via a communication network 80. The AR device 22 may also preferably wirelessly communicate with a PV solar-site based monitoring system 82 as symbolically illustrated, for example, by a Radio Frequency (RF) link 84. Thus, information from resources external to the AR device 22 may be available for display on the AR device 22. The AR device 22 may communicate over the radio link 84 using a short-range wireless connectivity protocol such as, for example, the Bluetooth® standard, a Wireless Local Area Network (WLAN) based connection, a Near-Field Communication (NFC) protocol, a protocol that supports Machine-to-Machine (M2M) communication, and the like. It is noted here that, in some embodiments, the AR device 22, but not the technician or service person 24 wearing the device 22, may be considered a part of the system 75. In other embodiments, the system 75 may include more or less or different types of functional entities than those shown in FIG. 6.

In one embodiment, the network 80 may be a packet-switched network such as, for example, an Internet Protocol (IP) network like the Internet, a circuit-switched network, such as the Public Switched Telephone Network (PSTN), or a combination of packet-switched and circuit-switched networks. In another embodiment, the network 80 may be an IP Multimedia Subsystem (IMS) based network, a satellite-based communication link, a Worldwide Interoperability for Microwave Access (WiMAX) system based on Institute of Electrical and Electronics Engineers (IEEE) standard IEEE 802.16e, an IP-based cellular network such as, for example, a Third Generation Partnership Project (3GPP) or 3GPP2 cellular network like a Long Term Evolution (LTE) network, a combination of cellular and non-cellular networks, a proprietary corporate network, a Public Land Mobile Network (PLMN), and the like.

The data source 77 may be a back-end server system containing a PV solar analytics database. The server system 77 may be a proprietary data source owned, operated, or maintained by, for example, a PV solar site installation/maintenance company. On the other hand, the data source 78 may form a back-end of publicly-available information related to PV solar sites and other ancillary content. The on-site monitoring system 82 may be in communication with various on-site equipments and may receive and store equipment-specific information therein. In one embodiment, the on-site system 82 may be in direct communication with the remote server 77—as indicated by the bi-directional dotted arrow 85. Such direct communication may be over a wired or wireless connection. Alternatively, the on-site system 82 may access the contents of the analytics server 77 through the communication network 80—as indicated by the bi-directional arrow 86. The network connections of the remote data sources 77-78 are illustrated by arrows 87-88, respectively. Similarly, the AR device's 22 connection with the network 80 is illustrated using the arrow 89.

In one embodiment, the AR device 22 may receive an indication from an external source, such as the remote server 77 or the on-site monitoring system 82 informing the device that it is present at a PV solar site. In another embodiment, the AR device 22 may have at least some of its captured visual content processed and analyzed by an external source, such as the remote server 77 and/or the on-site system 82. Thus, for example, the AR device 22 may itself process and analyze a portion of the captured visual content to determine the current activity-specific visual information to be displayed to the viewer, whereas the device 22 may send—such as, for example, through the network 80—another portion of the captured visual content to an external source, such as the remote analytics server 77, for processing and analysis. In one embodiment, the AR device 22 may receive activity-specific visual information from the external source 77 (and/or 78 or 82) to be displayed to the viewer 24. The device-generated or device-recorded visual information may be displayed along with the information received from the external device. In one embodiment, the device-generated data may include the visual content observed through the visible field of view of the AR device 22 by the viewer 24 for a PV solar site-specific activity and/or the activity-specific data recorded by the AR device 22. The recorded data may have been pre-stored in the memory of the AR device 22 or may have been recorded at run-time through the viewer's 24 observations of various equipments and other items associated with the site-specific activity. In some embodiments, the activity-specific information recorded or stored by the AR device 22 may be sent to the remote server 77 for further analysis.

Thus, the activity-specific content display on an AR device as per teachings of the present disclosure may be supported by a vast back-end of public and private information. For example, during site survey and installation, this could include information such as marketing information on the customer from the installing/financing company, expected PV generation, expected value of a PV system based on historical and current weather and power rates, and so on. During commissioning and afterwards for O&M, the augmented reality-based content display methodology may be supported by data from an on-site monitoring system, such as the system 82 in FIG. 6, that may communicate information either directly to the AR device 22 or via a server, such as the analytics server 77, as well as by cloud-based data and analytics like weather data, irradiance estimates, equipment manuals, and other supporting data. The cloud-based data and analytics may be retrieved from the remote server 77 and the publicly-available data sources 78 (when needed). The data collected by the monitoring system 82 may include PV DC and AC generation measurements, as well as data collected from equipment on site such as meters, inverters, weather stations, irradiance sensors, batteries, thermostats, etc.

In particular embodiments, the on-site data collection—for example, by the on-site monitoring system 82 and/or the AR device 22 in FIG. 6—may be combined with (i) a PV solar analytics engine 77 on the back end that combines processed data from the site, (ii) processed information from online public data sources such as satellite images and weather data (for example, irradiance), and (iii) business process data from different players in the PV solar site-specific value chain, to generate the activity-specific relevant information that may be fed to the AR device 22 for display to an installer/technician.

Figure 7:
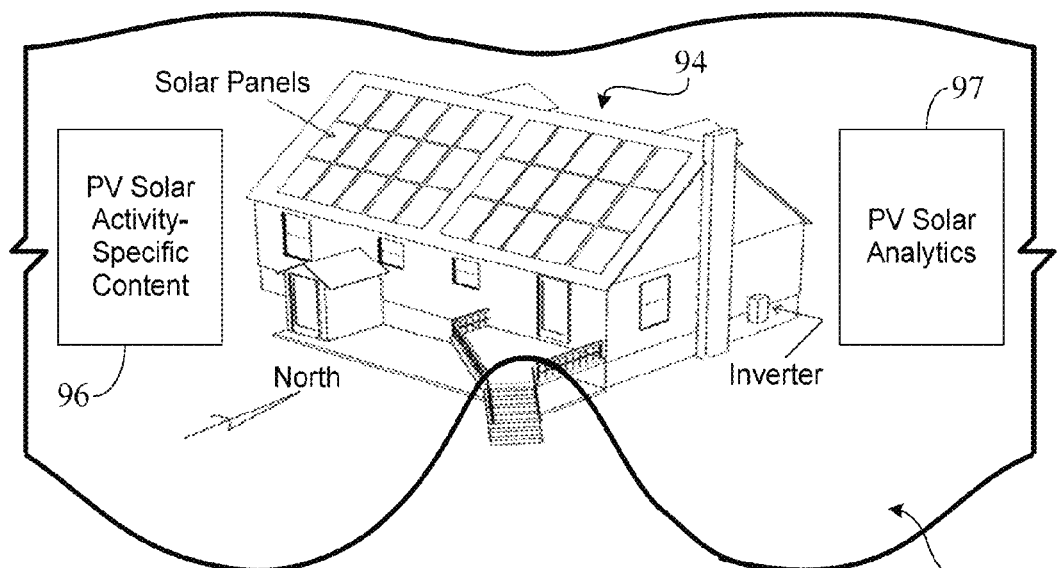
FIG. 7-9 provide exemplary illustrations of different display options for the PV solar site-specific information display methodology according to particular embodiments of the present disclosure.
Figure 8:
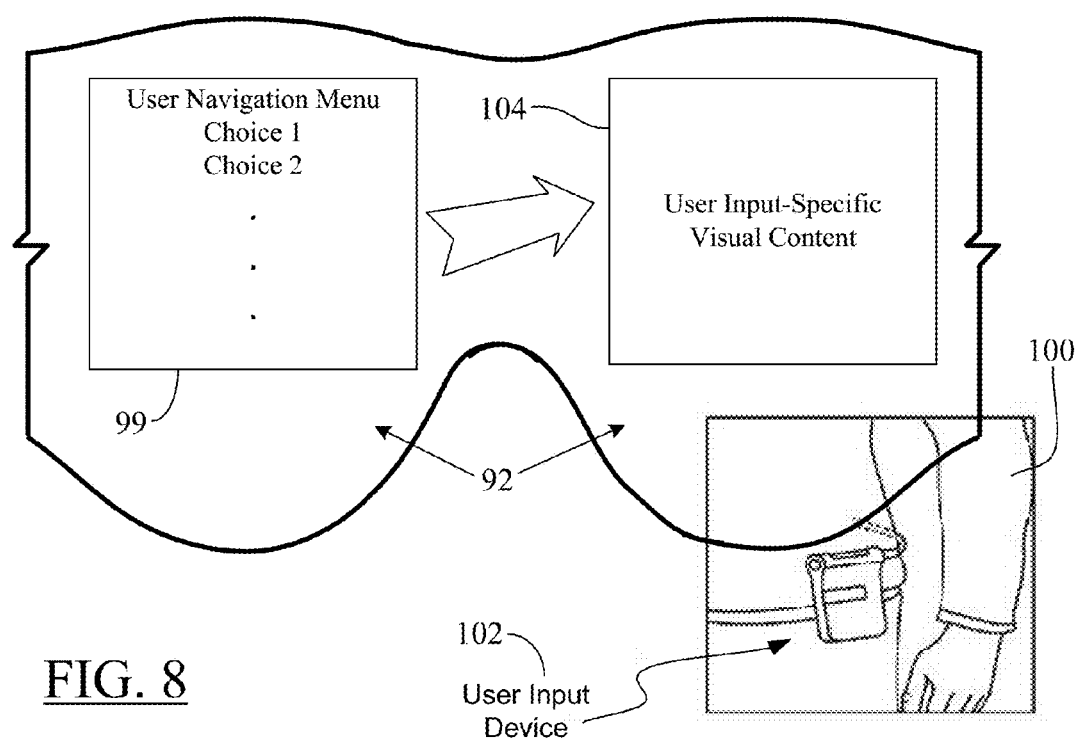
Figure 9:
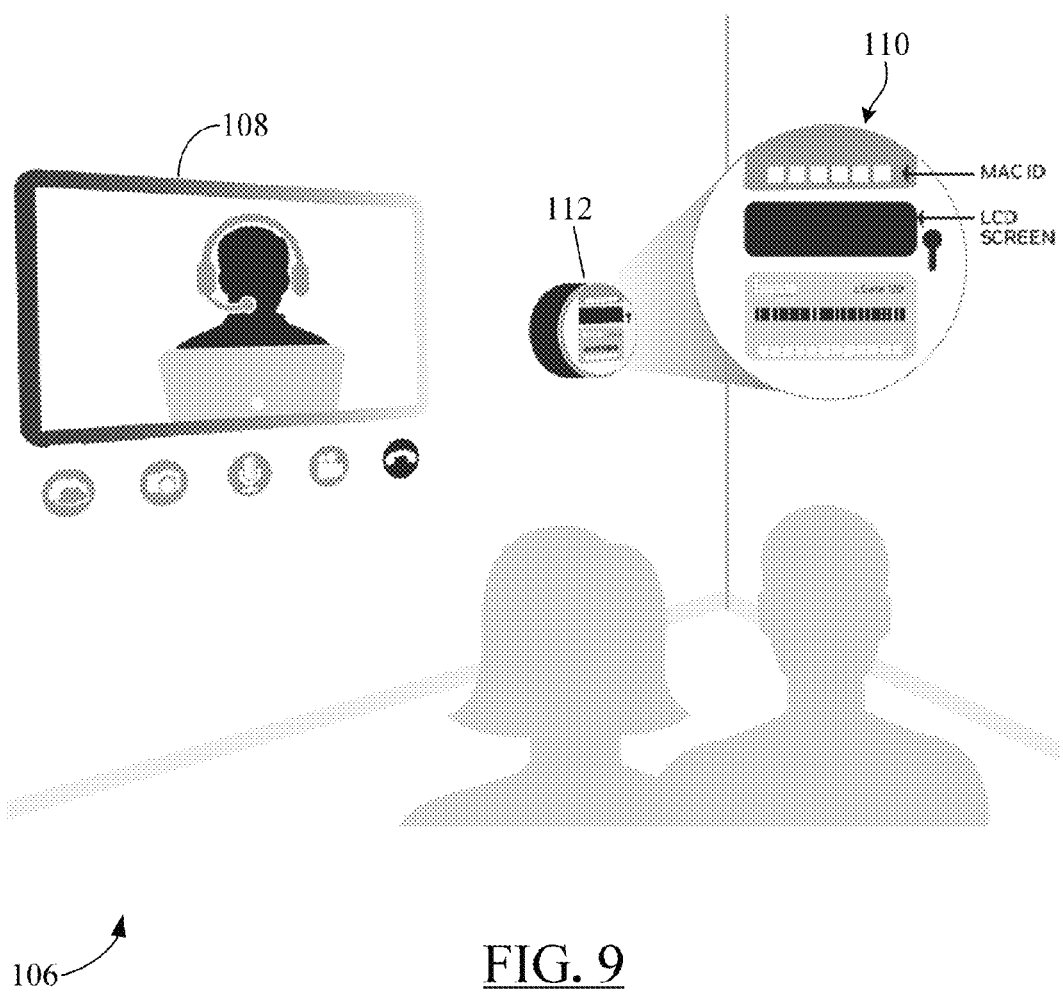

FIGS. 7-9 provide exemplary illustrations of different display options for the PV solar site-specific information display methodology according to particular embodiments of the present disclosure. In FIG. 7, a display screen 92 of an AR device is shown to be displaying an exemplary real object 94 in a user's field of view at a PV solar site (not shown). The display screen 92 may be the display screen of any of the earlier-mentioned AR devices 22, 37, or 50. The real object 94 in the exemplary illustration of FIG. 7 is a house with PV solar panels and associated equipments installed. In one embodiment, the display of the object 94 may include annotations, such as those shown in FIG. 7. The centered location of the object 94 in the user's visible field is for illustrative purpose only; the object may appear to the left or right on the display screen 92 as well. In the embodiment of FIG. 7, two blocks 96-97 are shown as being displayed on the display screen 92 along with the object 94. The first block 96 may display PV solar activity-specific content, whereas the second block 97 may display PV solar site-specific analytics such as, for example, weather data, irradiance estimates, expected PV generation, and the like. In one embodiment, the content block 97 may be absent. The information elements constituting the blocks 96-97 may be separately displayed, for example, if the AR device 37 of FIG. 3 is used; or may be overlaid on top of the object 94, for example, if the AR device 50 of FIG. 4 is used. Technically speaking, the "display" of the background visual content of the PV solar site—such as, for example, the object 94—may be through a transparent background or an opaque background. In case of the overlaid approach, the relevant information/content may be simply holographically projected on top of the surrounding environment with a transparent background so that the displayed information looks overlaid on top of the background visual (of the PV solar site). On the other hand, in case of the separate displays, the relevant information/content may be holographically projected with an opaque background to block off the background visual.

FIG. 8 shows the display screen 92 with a rudimentary user navigation menu 99 that may be displayed to a user, such as the user 100, when the user operates an input device 102 associated with the AR device. As discussed earlier, an input device, such as a touchpad, may be built-in as part of the AR device. However, in the embodiment of FIG. 8, the input device 102 is provided as an external attachment to the AR device. The input device 102 may be connected to the AR device via a wire/cord or wirelessly. Some examples of such an external input device include a touch pad, a small trackball, a miniature joystick, a pocket-size keypad, and the like. When a user input mode is activated—for example, using the input device 102, the AR device may detect such user input mode and, in response, the on-screen navigation menu 99 may display a list of user-selectable choices. When the user selects a choice, the user input-specific visual content related to the site-specific activity environment may be displayed on the display screen, as illustrated in a simplified manner using the block 104 in FIG. 8. For example, from the choices in the navigation menu 99, the user 100 may select a choice that offers details from the equipment manual of a PV solar equipment that is already installed at the PV solar site. In that case, the display portion 104 may display the details from the equipment manual. As in case of the embodiment in FIG. 7, the on-screen displays 99, 104 may be displayed either overlaid on top of real objects and surfaces in the user's visible field or as separate displays. Furthermore, in certain embodiments, the informational content of only one of the blocks 99, 104 may be displayed at a time.

FIG. 9 is an exemplary illustration of a display 106 that may be shown on the display screen of an AR unit worn by the technician. Thus, in the embodiment of FIG. 9, a technician may see two things projected on the AR unit's display screen by a holographic system: (i) a video conferencing window 108 showing a technical support person (located off-site) who can talk with the technician throughout the task being handled by the technician and who can also see everything that the technician can see in his/her field of vision, and (ii) a projected view 110 of an object 112 in the technician's field of view with annotations to provide a clear view of the object 112. The annotated view 110 may be helpful, for example, when the object is located at a hard-to-reach location or is not otherwise easily accessible. In one embodiment, such holographic system may be, for example, the AR device 50 of FIG. 4.

Figure 10:
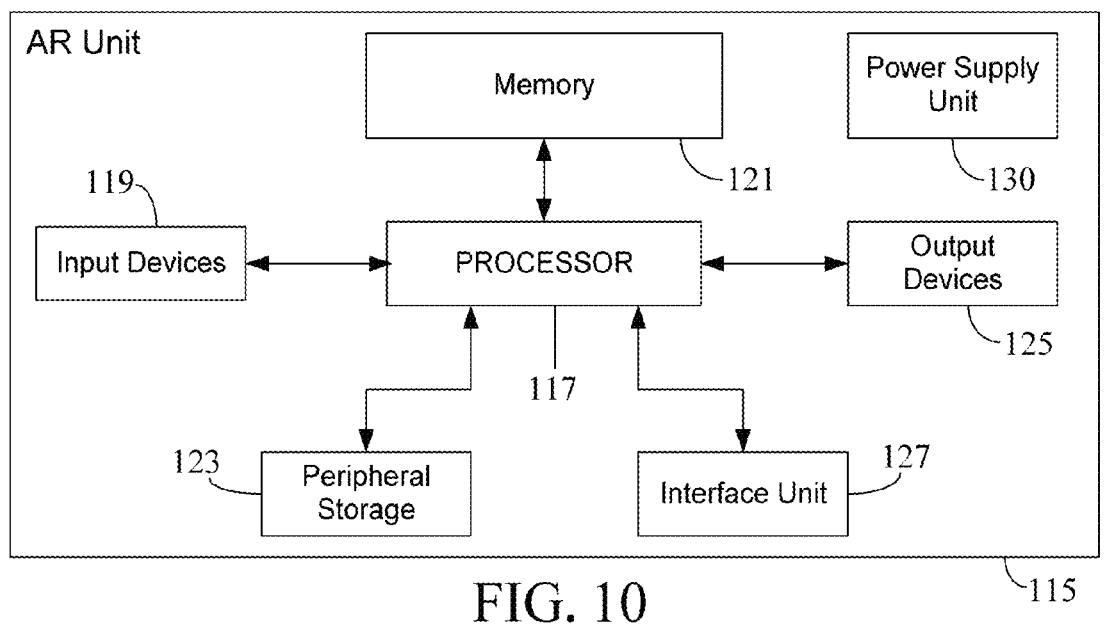
FIG. 10 depicts an exemplary block diagram of an AR device according to one embodiment of the present disclosure.

FIG. 10 depicts an exemplary block diagram of an AR device 115 according to one embodiment of the present disclosure. The AR device or system 115 may be any of the earlier-described AR devices 22, 37, or 50, suitably configured—in hardware and/or software—to implement the PV solar site-specific content display methodology according to the teachings of the present disclosure. The AR device 115 may include a processor 117 and ancillary hardware to accomplish the content display aspects discussed before. The processor 117 may be configured to interface with a number of external devices. In one embodiment, a number of input devices 119 may be part of the system 115 and may provide data inputs—such as user input, camera images, and the like—to the processor 117 for further processing. The input devices 119 may include, for example, a touchpad, a camera, an image sensor, a proximity sensor, a GPS sensor, a computer keyboard, a touch-screen, a joystick, a physical or virtual "clickable button," a computer mouse/pointing device, and the like. In FIG. 10, the processor 117 is shown coupled to a system memory 121, a peripheral storage unit 123, one or more output devices 125, and a network interface unit 127. A display screen is an example of an output device 125. In some embodiments, the system 115 may include more than one instance of the devices shown. In various embodiments, all of the components shown in FIG. 10 may be housed within a single housing. Thus, the system 115 may be configured as a standalone system or in any other suitable form factor. In some embodiments, the system 115 may be configured as a client system rather than a server system.

In particular embodiments, the AR device 115 may include more than one processor (e.g., in a distributed processing configuration). When the AR device 115 is a multiprocessor system, there may be more than one instance of the processor 117 or there may be multiple processors coupled to the processor 117 via their respective interfaces (not shown). The processor 117 may be a System on Chip (SoC) and/or may include more than one Central Processing Units (CPUs).

The system memory 121 may be any semiconductor-based storage system such as, for example, Dynamic Random Access Memory (DRAM), Static RAM (SRAM), Synchronous DRAM (SDRAM), Rambus® DRAM, flash memory, various types of Read Only Memory (ROM), and the like. In some embodiments, the system memory 121 may include multiple different types of semiconductor memories, as opposed to a single type of memory. In other embodiments, the system memory 121 may be a non-transitory data storage medium.

The peripheral storage unit 123, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, Secure Digital (SD) memory cards (including MicroSD memories), Universal Serial Bus (USB) memories, and the like. In some embodiments, the peripheral storage unit 123 may be coupled to the processor 117 via a standard peripheral interface such as a Small Computer System Interface (SCSI) interface, a Fibre Channel interface, a Firewire® (IEEE 1394) interface, a Peripheral Component Interface Express (PCI Express™) standard based interface, a USB protocol based interface, or another suitable interface. Various such storage devices may be non-transitory data storage media.

As mentioned earlier, a display screen may be an example of the output device 125. Other examples of an output device include a graphics/display device, a computer screen, an alarm system, a CAD/CAM (Computer Aided Design/Computer Aided Machining) system, a video game station, a smartphone display screen, or any other type of data output device. In some embodiments, the input device(s) 119 and the output device(s) 125 may be coupled to the processor 117 via an I/O or peripheral interface(s).

In one embodiment, the network interface 127 may communicate with the processor 117 to enable the system 115 to couple to a network, such as the network 80 in FIG. 6. In another embodiment, the network interface 127 may be absent altogether. The network interface 127 may include any suitable devices, media and/or protocol content for connecting the system 115 to a network—whether wired or wireless. In various embodiments, as mentioned before, the network may include Local Area Networks (LANs), Wide Area Networks (WANs), wired or wireless Ethernet, telecommunication networks, or other suitable types of networks.

The AR device 115 may include an on-board power supply unit 130 to provide electrical power to various system components illustrated in FIG. 10. The power supply unit 130 may receive batteries or may be connectable to an AC electrical power outlet. In one embodiment, the power supply unit 130 may convert solar energy or other renewable energy into electrical power.

In one embodiment, a non-transitory, computer-readable data storage medium, such as, for example, the system memory 121 or a peripheral data storage unit, such as a MicroSD memory card, may store program code or software. The processor 117 may be configured to execute the program code, whereby the AR device 115 may be operative to perform the display of PV solar site-specific activity environment as discussed hereinbefore—such as, for example, the operations discussed earlier with reference to FIGS. 5-9. The program code or software may be proprietary software or open source software which, upon execution by the processor 117 may enable the AR device 115 to capture visual content at the PV solar site, process the captured content or have it processed by a remote server, receive additional data from a remote data source, display the captured and/or received data content on the display screen of the AR device 115, and so on. In this manner, in certain embodiments, the display of information related to the PV solar site-specific activity environment may be performed using an AR device.

In the preceding description, for purposes of explanation and not limitation, specific details are set forth (such as particular architectures, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Thus, for example, it will be appreciated by those skilled in the art that block diagrams herein (e.g., in FIGS. 6 and 10) can represent conceptual views of illustrative circuitry or other functional units embodying the principles of the technology. Similarly, it will be appreciated that the flowchart in FIG. 5 represents various processes which may be substantially performed by a processor (e.g., the processor 117 in FIG. 10). Such a processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 2-9 also may be provided by such a processor, in the hardware and/or software. The processor 117 may employ distributed processing in certain embodiments.

When certain inventive aspects require software-based processing, such software or program code may reside in a computer-readable data storage medium. As noted earlier, such data storage medium may be part of the peripheral storage 123, or may be part of the system memory 121, or the processor's 117 internal memory (not shown). In one embodiment, the processor 117 may execute instructions stored on such a medium to carry out the software-based processing. The computer-readable data storage medium may be a non-transitory data storage medium containing a computer program, software, firmware, or microcode for execution by a general purpose computer or a processor mentioned above. Examples of computer-readable storage media include a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the AR device 115 according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various AR device-based display functions discussed herein may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a system and method in which information relevant to a PV solar-site specific activity environment is displayed on the display screen of an AR device as part of the surrounding environment, instead of on a separate computing device or an installation manual. The activity environment may include PV solar site-specific survey and feasibility analysis, installation and commissioning, O&M, and site overhaul/removal activities. Thus, relevant information is available to an installer/technician at their fingertips so that the installer/technician can continue the task they are involved in without losing focus. The AR device may also record relevant data during site survey and note important points, accelerate installation and commissioning, make O&M more efficient, and record the complete process for ongoing improvement/management of the site. Moreover, each solar financing company or installer could develop best practices, which may be loaded on the AR device as guidelines to make the process uniform across the entire fleet of installers, thereby improving the quality of the final outcome and, hence, resulting in a consistent customer experience.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. An Augmented Reality (AR) device operable to perform the following:
    monitor and analyze visual content associated with a visible field of view of the AR device to self-determine that the AR device is present at a Photovoltaic (PV) solar site, wherein the field of view includes a visible portion of a site-specific activity environment at the PV solar site, and wherein the site-specific activity environment includes one of the following PV site-specific activities:
        PV site survey and feasibility analysis activity,
        PV site installation and commissioning activity,
        PV site Operations and Maintenance (O&M) activity, and
        PV site overhaul activity;
    based on an analysis of the visual content, determine the site-specific activity environment surrounding the AR device; and
    display information related to the site-specific activity environment on a display screen of the AR device.

2. The AR device of claim 1, wherein the visual content is at least one of the following:
    still images; and
    video clips.

3. The AR device of claim 1, wherein the AR device is operable to
    have at least some of the visual content processed and analyzed by an external source.

4. The AR device of claim 1, wherein the AR device is operable to store the following in a memory of the AR device:
    one or more scenes visible through the field of view of the AR device; and
    an indication identifying the PV solar site-specific activity related information being displayed on the display screen of the AR device.

5. The AR device of claim 1, wherein the information related to the site-specific activity environment includes at least one of the following:
    first activity-specific data received from an external source for an activity in the site-specific activity environment;
    second activity-specific data observed through the visible field of view of the AR device by a user of the AR device for the activity in the site-specific activity environment; and
    third activity-specific data recorded by the AR device for the activity in the site-specific activity environment.

6. The AR device of claim 1, wherein the AR device is operable to further perform one of the following:
    display at least a first portion of the information related to the site-specific activity environment overlaid on the display screen on top of a field of view-based scene of the PV solar site; and
    display at least a second portion of the information related to the site-specific activity environment on the display screen without displaying other content on the display screen.

7. The AR device of claim 1, wherein the AR device is operable to further perform the following:
    receive an input from a user of the AR device; and
    display a user input-specific portion of the information related to the site-specific activity environment on the display screen of the AR device.

8. A non-transitory data storage medium operable with an Augmented Reality (AR) device and containing program instructions, which, when executed by the AR device, cause the AR device to perform the following:

capture and analyze visual content within a field of view of the AR device to self-determine that the AR device is present at a Photovoltaic (PV) solar site, wherein the field of view relates to a visible portion of a site-specific activity environment at the PV solar site, and wherein the site-specific activity environment includes one of the following PV site-specific activities:

PV site survey and feasibility analysis activity,

PV site installation and commissioning activity,

PV site Operations and Maintenance (O&M) activity, and

PV site overhaul activity;

based on an analysis of the visual content, determine the site-specific activity environment surrounding the AR device; and display information related to the site-specific activity environment on a display screen of the AR device.

9. The non-transitory data storage medium of claim 8, wherein the visual content is at least one of still images and video clips.

10. The non-transitory data storage medium of claim 9, wherein the program instructions, when executed by the AR device, cause the AR device to have at least some of the captured visual content processed and analyzed by an external source.

11. The non-transitory data storage medium of claim 8, wherein the information related to the site-specific activity environment includes at least one of the following:

first activity-specific data received from an external source for an activity in the site-specific activity environment;

second activity-specific data obtained through the captured visual content for the activity in the site-specific activity environment; and third activity-specific data recorded by the AR device for the activity in the site-specific activity environment.

12. The non-transitory data storage medium of claim 8, wherein the program instructions, when executed by the AR device, cause the AR device to further perform one of the following:

display at least a first portion of the information related to the site-specific activity environment overlaid on top of the visual content of the PV solar site; and display at least a second portion of the information related to the site-specific activity environment on the display screen without the visual content of the PV solar site.

13. The non-transitory data storage medium of claim 8, wherein the program instructions, when executed by the AR device, cause the AR device to further perform the following:

receive an input from a user of the AR device; and display a user input-specific portion of the information related to the site-specific activity environment on the display screen of the AR device.

14. The non-transitory data storage medium of claim 8, wherein the program instructions, when executed by the AR device, cause the AR device to store the following:

the visual content captured within the field of view of the AR device; and an indication identifying the PV solar site-specific activity related information being displayed on the display screen of the AR device.

15. A method of facilitating management of a Photovoltaic (PV) solar site using an Augmented Reality (AR) device, wherein the method comprises:

the AR device monitoring a visible field of view of the AR device;

the AR device capturing and analyzing visual content within the field of view of the AR device;

based on an analysis of the visual content, the AR device self-determining that the AR device is present at the PV solar site;

the AR device identifying a site-specific activity environment at the PV solar site based on the analysis of the captured visual content, wherein the site-specific activity environment includes one of the following PV site-specific activities:

PV site survey and feasibility analysis activity,

PV site installation and commissioning activity,

PV site Operations and Maintenance (O&M) activity, and

PV site overhaul activity; and the AR device displaying information related to the site-specific activity environment on a display screen of the AR device.

16. The method of claim 15, further comprising:

the AR device processing and analyzing a first portion of the captured visual content to determine first activity-specific visual information for an activity in the site-specific activity environment;

the AR device sending a second portion of the captured visual content to an external source for processing and analysis;

the AR device receiving second activity-specific visual information from the external source for the activity in the site-specific activity environment; and the AR device displaying the first and the second activity-specific visual information on the display screen of the AR device.

17. The method of claim 15, wherein the AR device displaying information related to the site-specific activity environment includes at least one of the following:

the AR device displaying at least a first portion of the information related to the site-specific activity environment overlaid on top of the field of view-based visual content of the PV solar site;

the AR device displaying at least a second portion of the information related to the site-specific activity environment on the display screen without the field of view-based visual content of the PV solar site; and upon receiving an input from a user of the AR device, the AR device displaying a user input-specific portion of the information related to the site-specific activity environment on the display screen.

* * * * *